US007105983B2

(12) United States Patent
Day et al.

(10) Patent No.: US 7,105,983 B2
(45) Date of Patent: Sep. 12, 2006

(54) ELECTRICAL CONTACT TECHNOLOGY AND METHODOLOGY FOR THE MANUFACTURE OF LARGE-DIAMETER ELECTRICAL SLIP RINGS

(75) Inventors: Michael J. Day, Blacksburg, VA (US); Norris E. Lewis, Christiansburg, VA (US); Jerry T. Perdue, Christiansburg, VA (US); Larry D. Vaught, Pembroke, VA (US); Hettie H. Webb, Radford, VA (US); Barry K. Witherspoon, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 10/871,090

(22) Filed: Jun. 18, 2004

(65) Prior Publication Data

US 2005/0280329 A1 Dec. 22, 2005

(51) Int. Cl.
*H02K 39/08* (2006.01)

(52) U.S. Cl. ...................................... 310/323; 310/238

(58) Field of Classification Search ........ 310/231–233, 310/238, 251
See application file for complete search history.

(56) References Cited

U.S. PATENT DOCUMENTS 3,648,088 A * 3/1972 Wilkin et al. ............... 310/178
4,398,113 A * 8/1983 Lewis et al. ................ 310/232

* cited by examiner

*Primary Examiner*—Thanh Lam
(74) *Attorney, Agent, or Firm*—Phillips Lytle LLP

(57) ABSTRACT

The present invention provides several improvements in a slip ring (36) that is adapted to provide electrical contact between a rotor (42) and stator (40). In one aspect, a brush tube (39) is crimped around the upper marginal end portions of a plurality of individual fibers (38) inserted therein. In another aspect, a collimator tube (41) extends downwardly beyond the end of the brush tube to limit lateral movement of the fibers in the bundle when the rotor rotates. In yet another arrangement, a spring (55, 56) is arranged to bear against a current-carrying conductor to adjustably vary the force by which the lower ends of the fibers are urged to move toward the rotor.

17 Claims, 2 Drawing Sheets

ELECTRICAL CONTACT TECHNOLOGY AND METHODOLOGY FOR THE MANUFACTURE OF LARGE-DIAMETER ELECTRICAL SLIP RINGS

TECHNICAL FIELD

The present invention relates generally to slip rings for communicating electrical power and/or signal(s) between a rotor and stator, and, more particularly, to improvements in large-diameter slip rings that allow higher current densities, longer life, and higher rotor surface speeds to be achieved at lower costs than with current slip ring technology.

BACKGROUND ART

Electrical slip rings are used to transfer electrical power and/or signal(s) between a rotor and a stator. These devices are used in many different military and commercial applications, such as solar array drive mechanisms, aircraft and missile guidance platforms, undersea robots, CATSCAN systems, and the like. In some of these applications, slip rings are used in conjunction with other rotary components, such as torque motors, resolvers and encoders. Electrical slip rings must be designed to be located either on the platform axis of rotation, or be designed with an open bore which locates the electrical contacts off-axis. Hence, the designations "on-axis" and "off-axis" slip rings, respectively. The diameter of slip ring motors may range from a fraction of an inch to multiple feet, and the angular speed may vary from one revolution per day to as much as 20,000 revolutions per minute. In all of these applications, the electrical contacts between the rotor and stator must: (1) transfer power and/or signal(s) without interruption at high surface speeds, (2) have long wear life, (3) maintain low electrical noise, and (4) be of a physical size that allows multiple circuits to be packaged in a minimum volume.

The most efficient management of the electrical and mechanical contact physics allows the most demanding requirements to be met. For example, if the application is an off-axis slip ring that allows the x-ray tube in a CATSCAN gantry to rotate about the patient's body, the electrical contacts must be designed to carry about 100–200 amps (with surges of hundreds of amps), operate at surface speeds on the order of 500 inches per second, last for 100 million revolutions, and occupy a minimal volume within the gantry. In order to meet the 100 million revolution requirement for a device that is about six feet in diameter, the brush force must be low to minimize frictional heating and to maintain a large number of contact points between brush and ring to achieve the required current density.

Four types of electrical contacts between a rotor and stator include: (1) a composite solid material brush on a cantilevered spring, (2) a monofilament metal alloy brush that tangentially engages the rotor, (3) a fiber brush having a plurality of individual fibers, with the bundle tangentially engaging the rotor, and (4) a tip-of-fiber contact between the brush and rotor. The contact force, surface speeds and type of lubrication for each contact type is summarized in Table I. Table I also shows the types of lubricants required to reduce the contact frictional heating if the brush force is above one gram.

TABLE I

| Contact Type | Contact Force | Surface Speeds | Type of Lubrication |
|---|---|---|---|
| composite brush | 0.4 kg/cm$^2$ | 700 in/sec | sacrificial graphite film* |
| monofilament metal alloy | 3–20 grams | 12 in/sec | boundary lubrication** |
| tangential fiber brush | 1–3 grams | 200 in/sec | adventitious*** |
| fiber-on-tip | 0.1–1 grams | 1200 in/sec | adventitious*** |

*With a sacrificial graphite film, the brush and ring interface is lubricated by a film of graphite that is transferred from the brush to the ring. Material that is worn away is replaced by graphite from the brush.
**With boundary lubrication, a boundary lubricant film supports a portion of the load between the contact members. The points of metal contact support the remaining load between the contact members, and provide the current-carrying capability.
***With adventitious films, very thin films of materials that are capable of reducing the coefficient of friction between the contact members under light loads.

The tribological properties of electrical contacts and the right choice of lubricant to meet the requirements of the application are extremely important. For example, if the contacts are to be used in a space application, then the lubricant must meet all of the requirements of a ground-based application, and have a low vapor pressure. If the contacts have a long life requirement, then dust, wear debris and other contaminants may accumulate in the contact zone and create problems with life and signal transfer. However, if the electrical contact members can be brought together with a force of about one gram or less, then the lubricant and the associated complications are eliminated.

For several years, fiber brushes with a tangential orientation to the ring have been successfully used to meet high surface speeds without the use of a lubricant.

When manufacturing slip rings in the range of four to six feet in diameter, the costs of the ring material, as well as the costs associated with the equipment used to cast the dielectric material that supports the rings, the costs of equipment required to machine the support structure, and the costs of the equipment used to electroplate precious metal on a ring, rise dramatically if a continuous ring approach is used. Large-diameter rings are normally machined from plate stock or tubing of the appropriate size. Another option is to form a metal strip of the required cross-section, to bend it into an annulus or ring, and to weld the facing ends together. In this case, the dimensional tolerances that must be held for the ring I.D. and O.D. cause the continuous ring to be prohibitively expensive. In addition, the bath required to electrodeposit metal on a six foot diameter ring is five to six times more expensive than that required for a 120° length of arc used to fabricate a segmented slip ring of the same diameter.

FIGS. 12–14 illustrate some concepts that can be used to fabricate a large-diameter slip ring. FIG. 12 shows a continuous ring, with three 120° segments used to form the ring. FIGS. 13 and 14 illustrate the option of using less ring material, but more brushes, to maintain continuity between the rotor and stator at all angular positions of the rotor. The support structures for these segments are representatively shown and described in U.S. Pat. No. 6,664,697 B2, the aggregate disclosure of which is hereby incorporated by reference.

U.S. Pat. No. 5,054,189, the aggregate disclosure of which is hereby also incorporated by reference, teaches a method of manufacturing an annular dielectric base portion of an electrical slip ring assembly having multiple electrical rings formed in the outer circumference. The rings are formed from conductive metal strips of the appropriate cross-sectional shape and configuration. When each ring is wrapped around the circumference of the base, the facing ends are intended to abut one anther. However, because of dimensional variations in the base O.D. and dimensional variations in the length of the strip used to form the conductive ring, the facing ring ends sometimes do not abut properly. In practice, the length of the ring is controlled such that a gap always exists between the facing ring ends. This gap may vary from about 0.020 inches to about 0.040 inches. The brush technology used with this ring structure is the tangential fiber brush, which can readily move over that gap without mechanical and/or electrical interference (see, e.g., FIG. 4). Over ten years of experience has shown that as the slip ring rotates, brush and ring wear debris and other particulate contaminants will accumulate in the gap. As the brushes continue to move over the gap, finely divided particles are dragged onto the ring surface, creating electrically-insulating films. Thus, problems develop with electrical signal transmission. Millions of ring revolutions may occur because these problems develop.

The intent of the improved slip ring design and manufacturing methodology disclosed herein is to reduce the width of the gap between the ring ends. This is accomplished by a process of adjusting the length of at least one of the segments such that the widths of the various affected gaps are minimized.

It would be generally desirable to provide an improved slip ring that would allow longer life, higher current densities, and higher rotor surface speeds to be achieved a lower costs that with current slip ring technology.

DISCLOSURE OF THE INVENTION

With parenthetical reference to the corresponding parts, portions or surfaces of the disclosed embodiments, merely for purposes of illustration and not by way of limitation, the present invention provides several improvements in slip rings that allow such slip rings to operate at higher current densities, and to run longer, more quietly and at higher rotor surface speeds than heretofore thought possible.

In one aspect, the invention provides a first improvement in a slip ring (43) adapted to provide electrical contact between a stator (48) and a rotor (47). This improvement broadly comprises: a current-carrying conductor (48) mounted on the stator; a brush tube (45) mounted on the conductor; a fiber bundle (44), the individual fibers of the bundle having a diameter of less that about 3 mils, the upper marginal end portions of the fibers being received in the brush tube, the upper margin of the brush tube being crimped or swaged to hold the upper marginal end portions of the fibers therein, the lower ends of the fibers in the bundle extending beyond the brush tube and being adapted to engage the rotor, the fibers having an average free length of about 8–10 mm; and a collimator tube (46) surrounding a portion of the brush tube and extending therebeyond, the lower end of the collimator tube being adapted to limit lateral movement of the fibers in the bundle when the rotor rotates.

The collimator tube may be adjustably mounted on and/or concentric with the brush tube. The length of overlap of the collimator and brush tubes is adjustable. The fibers may have an average length-to-diameter ratio of at least 100:1. The conductor may be mounted as a cantilever on the stator. The brush tube may be soldered or welded (as indicated at 49) to the conductor.

The rotor may have at least one electrically-conductive segment, and the lower ends of the fibers may be urged to move toward the rotor segment with a force on the order of about 0.1–0.2 grams. The rotor may have a plurality of such segments arranged in circumferentially-spaced locations about the rotor. In one form, adjacent segments are not contiguous but are in electrical contact with one another. In another form, adjacent segments are contiguous and the portions of adjacent segments that are arranged proximate the joint therebetween and that face toward the fiber bundle are substantially flush. In one particular form, the rotor has three of the segments, and each segment occupies an arc distance of about 120°. The slip ring may further include a spring (55, 56) arranged to bear against the conductor to urge the lower ends of the fibers to move toward the rotor. The force exerted by the spring on the conductor may be adjustable, as by means of a threaded connection.

In another aspect (e.g., as shown in FIG. 10), the invention provides a second improvement in a slip ring (51) adapted to provide electrical contact between a stator (54) and a rotor (58). This improvement broadly includes: a current-carrying conductor (54) mounted on the stator; a brush tube (53) mounted on the conductor; a fiber bundle (52), the individual fibers of the bundle having a diameter of less that about 3 mils, the upper marginal end portions of the fibers being received in the brush tube, the upper margin of the brush tube being crimped or swaged to hold the upper marginal end portions of the fibers therein, the lower ends of the fibers in the bundle extending beyond the brush tube and being adapted to engage the rotor, the fibers having an average free length of about 8–10 mm; and a spring (55, 56) arranged to bear against the conductor to urge the lower ends of the fibers to move toward the rotor.

The force exerted by the spring on the conductor may be adjustable, as by a threaded connection. The conductor may be mounted as a cantilever on the stator.

The rotor may have at least one electrically-conductive segment, and the lower ends of the fibers may be urged to move toward the rotor segment with a force on the order of about 0.1–0.2 grams. The rotor may have a plurality of the segments arranged in circumferentially-spaced locations about the rotor. In one form, adjacent segments are not contiguous but are in electrical contact with one another. In another form, adjacent segments are contiguous and the portions of adjacent segments that are arranged proximate the joint therebetween and that face toward the fiber bundle are substantially flush with one another. In one specific form, the rotor has three of the segments, and each segment occupies an arc distance of about 120°.

In still another aspect, the invention provides a third improvement in a slip ring (43). This improvement includes: a current-carrying conductor (48) mounted on the stator; a brush tube (45) mounted on the conductor; and a fiber bundle (44), the individual fibers of the bundle having a diameter of less that about 3 mils, the upper marginal end portions of the fibers being received in the brush tube, the upper margin of the brush tube being crimped or swaged to hold the upper marginal end portions of the fibers therein, the lower ends of the fibers in the bundle extending beyond the brush tube and being adapted to engage the rotor, the fibers having an average free length of about 8–10 mm.

The conductor may be provided with an opening to accommodate passage of the upper margin of the brush tube. The brush tube may be soldered or welded to the conductor.

The rotor may have at least one electrically-conductive segment, and the lower ends of the fibers may be urged to move toward the rotor segment with a force on the order of about 0.1–0.2 grams. In one form, the rotor has a plurality of the segments arranged in circumferentially-spaced locations about the rotor. In another form, adjacent segments are not contiguous but are in electrical contact with one another. In one specific form, the rotor has three of the segments, and each segment occupies an arc distance of about 120°.

Accordingly, the general object of this invention is to provide certain improvements in high-speed slip rings.

Another object is to provide a first improvement in a high current density, long-life, high-speed slip ring, which improvement includes a collimator tube overlapping a portion of a brush tube and extending downwardly therefrom to limit lateral movement of a brush bundle when a rotor rotates.

Another object is to provide a second improvement in a high-speed slip ring, in which a spring is arranged to bear against a conductor to urge the low end of brush fibers to move toward a rotor.

Still another object is to provide a third improvement in a slip ring which a bundle of fibers have their upper marginal end portions received in a brush tube, and wherein the brush tube is crimped or swaged to hold the fiber bundle and brush tube together.

These and other objects and advantages will become apparent from the foregoing and ongoing written specification, the drawings, and the appended claims.

DESCRIPTION OF THE PREFERRED EMBODIMENTS

Figure 1:
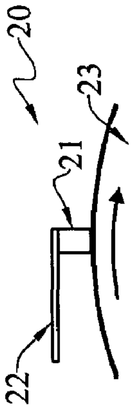
Fig. 1 (PRIOR ART)
FIG. 1 is a schematic view of a prior art slip ring having a solid composite brush material mounted on a cantilevered spring.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms “horizontal”, “vertical”, “left”, “right”, “up” and “down”, as well as adjectival and adverbial derivatives thereof (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or axis of rotation, as appropriate.

Referring now to the drawings, a sequence of development in slip rings is comparatively illustrated in FIGS. 1–6.

FIG. 1 schematically illustrates a well-known prior art slip ring in which a graphite or metal/graphite composite solid member 21 was mounted on the distal end of a cantilevered current-carrying conductor 22. The lower ends of the composite was arranged to engage the outer surface of a rotor 23. In this form, the graphite in the composite acted as its own lubricant. For higher current carrying capabilities, the graphite was alloyed with copper or silver. The rotor was typically coin silver, electrodeposited silver, and, in some cases, brass. This arrangement had three major points of contact, somewhat like a milking stool. The typical maximum current density was on the order of about 100–200 amps/inch$^2$.

Figure 2:
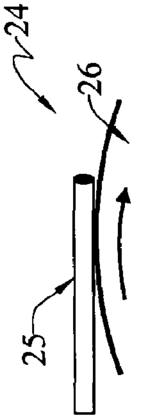
Fig. 2 (PRIOR ART)
FIG. 2 is a schematic view of a prior art slip ring in which a monofilament metal alloy brush was arranged to tangentially engage a portion of a rotor.
Figure 3:
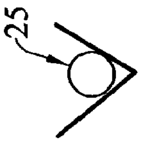
Fig. 3 (PRIOR ART)
FIG. 3 is an enlarged right end view of the monofilament brush shown in FIG. 2.
Figure 4:
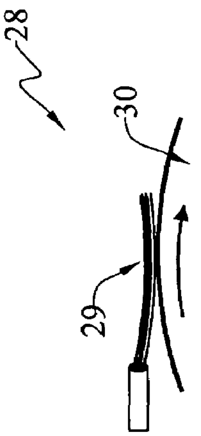
Fig. 4 (PRIOR ART)
FIG. 4 is a schematic view of a prior art slip ring in which a fiber brush was operatively arranged to tangentially engage a portion of a rotor.
Figure 5:
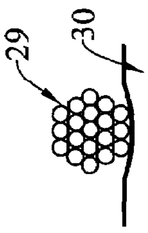
Fig. 5 (PRIOR ART)
FIG. 5 is an enlarged right end view of the brush shown in FIG. 4.

In an attempt to solve the problems attendant to the prior art composite arrangement shown in FIG. 1, others then developed a monofilament metal alloy brush 24, such as shown in FIGS. 2 and 3. In this arrangement, a monofilament metal alloy 25, usually gold or platinum, was caused to tangentially bear against the outer surface of a rotor 26 with something on the order of 4–6 grams of force. However, as the prior art attempted to increase the current carrying capability, the contact resistance became a problem.

In an attempt to solve the problems attendant the monofilament metal alloy brush shown in FIG. 2, the prior art then developed a fiber brush 28, such as shown in FIG.

4. Here, a plurality of individual monofilament metal alloy fibers 29 issued from a hollow tube, and tangentially engaged the rotor 30.

Figure 6:
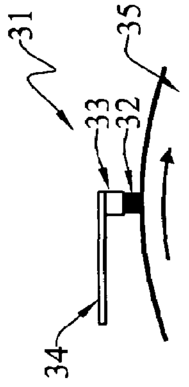
Fig. 6 (PRIOR ART)
FIG. 6 is a schematic view of yet another prior art slip ring in which a fiber-on-tip brush is arranged to normally or perpendicularly engage a rotor.

Thereafter, the prior art developed a fiber-on-tip arrangement, generally indicated at 31 in FIG. 6. In this arrangement, a plurality of individual fibers, severally indicated at 32, had their upper ends received in a cylindrical brush tube 33 that was mounted on the distal end of a current-carrying conductor 34. The lower marginal ends of these fibers engaged the rotor 35.

Figure 7:
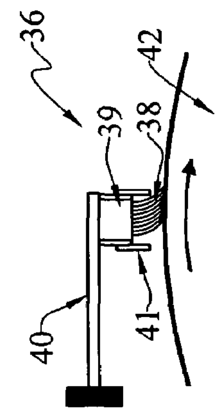
FIG. 7 is a schematic view of an improved high-speed slip ring incorporating a first form of the inventive improvement, this view showing the collimator tube as extending downwardly beyond the brush tube, with the rotor being indicated as rotating in a clockwise direction.
Figure 8:
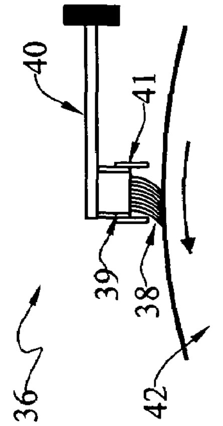
FIG. 8 is a schematic view generally similar to FIG. 7, but illustrating the rotor as rotating in a counter-clockwise direction.

The present invention improves on the arrangement shown in FIG. 6. Referring now to FIGS. 7 and 8, and improved slip ring, generally indicated at 36, is shown has having a plurality of fibers 38 having their upper marginal end portions received in a brush tube 39. The brush tube is again mounted on the distal end of a current-carrying conductor 40. A collimator tube 41 overlaps a portion of the brush tube, and extends downwardly therebeyond. The function of this collimator tube is to limit lateral movement of the individual fibers in the bundle when the rotor rotates. In FIG. 7, rotor 42 is shown as rotating in a clockwise direction. In FIG. 8, the rotor is shown as rotating in a counter-clockwise direction, and the direction of brush sweep is reversed from that shown in FIG. 7.

Figure 9:
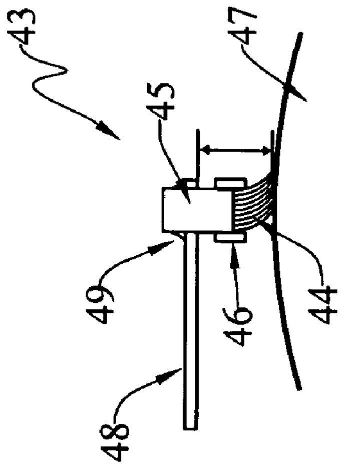
FIG. 9 is schematic view of an improved high-speed slip ring with the collimator tube, with the upper marginal end portions of the fibers arranged within the brush tube, with the brush tube crimped or swaged to hold the fibers therein, and with the brush tube indicated as being soldered to hold it to the current-carrying conductor.

FIG. 9 illustrates yet another improved slip ring, generally indicated at 43. In this form, the plurality of individual fibers, severally indicated at 44, have their upper marginal end portions received in a brush tube 45. Thereafter, the upper margin of the brush tube is swaged or crimped so as to compress the upper margins of the individual fibers therein. A collimator tube 46 is shown as depending from the lower margin of the brush tube. In this form, the current-carrying conductor 48 is shown as having an opening to receive passage of the upper marginal end portion of the crimped brush tube-and-fiber-subcombination. The brush is tube is connected to the current-carrying conductor by an annular solder or weld bead, generally indicated at 49.

Figure 10:
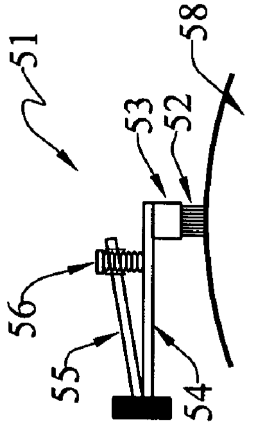
FIG. 10 is a schematic view of yet another form of improved high-speed slip ring in which an auxiliary spring is operatively arranged to bear against the current-carrying conductor, for urging the lower marginal tips of the individual brush fibers to more toward the rotor.

FIG. 10 illustrates yet another high current density, long-life, high-speed slip ring, generally indicated at 51. In this form, a plurality of individual fibers 52 have their upper marginal end portions received in a cylindrical brush tube 53 that is mounted on and depends from the distal end of a cantilevered current-carrying conductor 54. An auxiliary spring, 55 issues from the cantilever support. A threaded member 56 matingly engages an opening provided through the auxiliary spring 55. The lower end of this member bears against current-carrying conductor 54. Thus, threaded member 56 may be rotated in the appropriate direction to vary the force exerted by the auxiliary spring on the current-carrying conductor, thereby to vary the force by which the tips of the individual fibers are urged to move toward the rotor 58.

Figure 11:
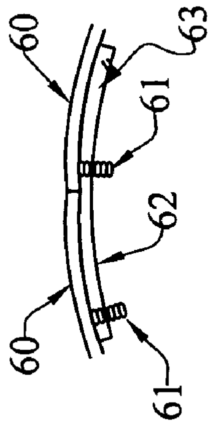
FIG. 11 is a schematic view of two electrically-conductive segments adapted to be mounted on a rotor, with the ends abutting one another, and with the facing marginal end portions being substantially flush.

FIG. 11 illustrates two segments, severally indicated at 60, respectively, that are adapted to be mounted on the rotor by means of studs 61. In this particular form, the two adjacent current-carrying segments have their end faces abut one another. It should be noted that the end faces are of slightly reduced diameter as the facing ends of the segments are approached, but that the two abutting surfaces are substantially flush (i.e., of equal radius from the center of the rotor) with one another. Otherwise stated, they are arranged at substantially the same radius in the vicinity of their facing end faces so that there will be no step-change in radial height in either direction of rotation. The two segments are maintained in electrical connection by means of a radially-inward connector 63.

Figure 12:
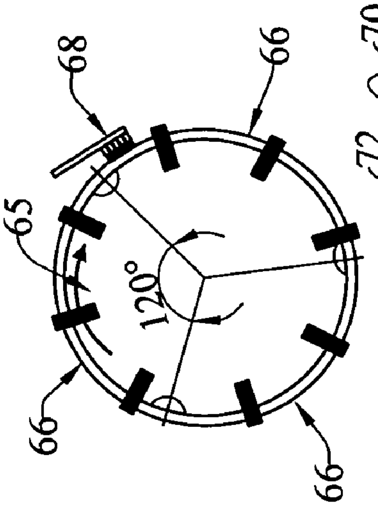
FIG. 12 is a schematic view of an improved large-diameter slip ring having three current-carrying segments arranged to abut one another, with a single slip ring engaging the outer surface of the rotor.

FIG. 12 is a schematic view of an improved large-diameter slip ring having three segments mounted on the rotor. In this form, the segments occupy arc distances of about 120°, and having their facing ends abutting one another. The rotor is generally indicated at 65, and the individual segments are severally indicated at 66. A brush 68 is mounted on the stator and engages the outer surface of the segments. This represents an improvement in that a large-diameter rotor may be manufactured by assembling a plurality of segments together. This avoids having to handle a large-diameter rotor per se. Rather, the various individual segments can be manufactured, and thereafter assembled together to form the large-diameter rotor.

Figure 13:
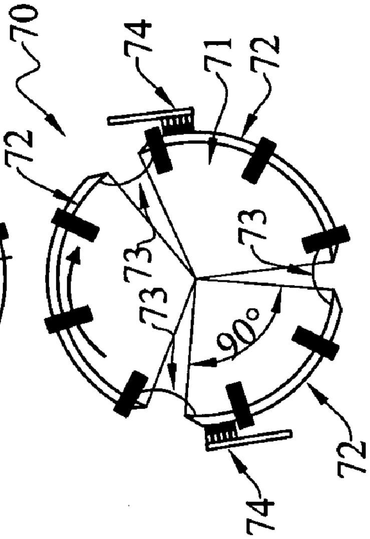
FIG. 13 is a schematic view of an alternative slip ring form, again having three current-carrying segments, although the segments are physically separated from one another but electrically connected.

FIG. 13 is a schematic view of another arrangement, generally indicated at 70. In this form, the rotor 71 is shown as carrying three segments, severally indicated at 72. However, unlike the arrangement shown in FIG. 12, in this form, the segments are physically interrupted from one another, but are electrically in contact by means of brush wires 73. In this form, two brushes are shown as being in communication with the outer surface of the segments. The brushes are arranged such that at least one of the brushes a segment at each and every angular position of the rotor.

Figure 14:
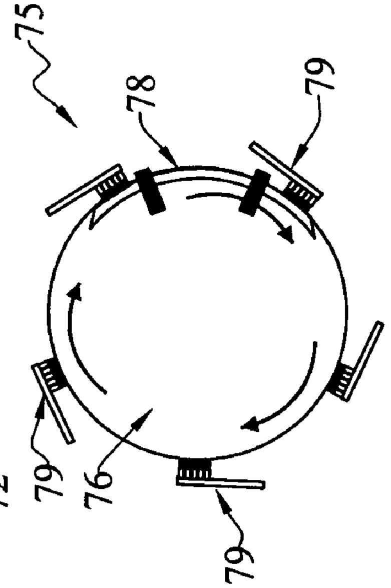
FIG. 14 is schematic view of yet another form of improved slip ring having a single current-carrying segment, with a plurality of brushes thereabout such that at least one of the brush will always be in communication with these current-carrying segments at all operative angular positions of the rotor.

Still another arrangement is generally indicated at 75 in FIG. 14. In this form, the rotor 76 has a single arcuate segment 78. A plurality of brushes, severally indicated at 79, are mounted on the stator and are spaced circumferentially about the rotor such that at least one of brushes will physically contact the outer surface of the current-carrying segment 78 at any annular position of the rotor.

Therefore, the present invention broadly provides various improvements in a slip ring that is adapted to provide electrical contact between a stator and rotor. Typically such a slip ring has a current-carrying conductor mounted on the stator. A brush tube is mounted on the conductor. A fiber bundle has individual fibers of less than about 3 mils in diameter. The upper marginal end portions of these fibers are received in the brush tube. The upper margin of the brush tube is crimped or swaged to hold the upper marginal end portions of the fibers therein. The lower ends of the fibers in the bundle extend downwardly beyond the brush tube and are adapted to engage the rotor. These fibers have a free length of about 8–10 mm.

In one form, the improvement comprises a collimator tube surrounding a portion of the brush tube and extending therebeyond. The lower end of the collimator tube is adapted to limit lateral movement of the fibers in the bundle when the rotor rotates.

In another aspect, the invention provides an improvement in such a slip ring. In this form, the improvement includes a spring that is adapted to bear against the conductor to urge the lower ends of the fibers to move toward the rotor.

In still another aspect, the invention simply provides an improved way of creating and moving a fiber bundle. In this arrangement, the individual fibers are received in a brush tube. The brush tube is then crimped or swaged about the fibers to form a subassembly somewhat resembling an old time shaving brush.

Modifications

The present invention expressly contemplates that many changes and modifications may be made. For example, the shape and configuration of the brush tube and collimator tube may be changed as desired. The materials of construction are not deemed to be particularly critical, and may be readily changed or modified by persons skilled in this art.

As noted in FIGS. 12–14, it is possible to build a very large rotor using various arcuate segments. These segments may be contiguous, or may be physically interrupted, albeit connected electrically. Here again, the size and shaping of such rotor and rotor segments may be changed or modified as desired.

Therefore, while several forms of the various improvements have been shown and described, and several modifications thereof discussed, persons skilled in this art will readily appreciate that various additional changes and modifications may be made without departing from the spirit of the invention, as defined and differentiated by the following claims.

What is claimed is:

1. In a slip ring adapted to provide electrical contact between a stator and a rotor, the improvement comprising:

a current-carrying conductor mounted on said stator;

a brush tube mounted on said conductor;

a fiber bundle composed of a number of individual fibers, the upper marginal end portions of said fibers being received in said brush tube, a portion of said brush tube being crimped or swaged to hold the upper marginal end portions of said fibers therein, the lower ends of the fibers in said bundle extending beyond said brush tube and being adapted to engage said rotor; and a collimator tube surrounding a portion of said brush tube and extending therebeyond, the lower end of said collimator tube being adapted to limit lateral movement of the lower marginal end portions of said fibers in said bundle when said rotor rotates relative to said stator.

2. The improvement as set forth in claim 1 wherein said collimator tube is adjustably mounted on said brush tube.

3. The improvement as set forth in claim 2 wherein said collimator tube is concentric with said brush tube.

4. The improvement as set forth in claim 3 wherein the length of overlap of said collimator and brush tubes is adjustable.

5. The improvement as set forth in claim 1 wherein said fibers have an average length-to-diameter ratio of at least 100:1.

6. The improvement as set forth in claim 1 wherein said conductor is mounted as a cantilever on said stator.

7. The improvement as set forth in claim 1 wherein said brush tube is soldered or welded to said conductor.

8. The improvement as set forth in claim 1 wherein said rotor has at least one electrically-conductive segment, and wherein the lower ends of said fibers are urged to move toward said rotor segment with a force on the order of about 0.1–0.2 grams.

9. The improvement as set forth in claim 8 wherein said rotor has a plurality of said segments arranged in circumferentially-spaced locations about said rotor.

10. The improvement as set forth in claim 9 wherein adjacent segments are not contiguous but are in electrical contact with one another.

11. The improvement as set forth in claim 9 wherein adjacent segments are contiguous and wherein the portions of adjacent segments that are arranged proximate the joint therebetween and that face toward said fiber bundle are substantially flush.

12. The improvement as set forth in claim 9 wherein said rotor has three of said segments, and each segment occupies an arc distance of about 120°.

13. The improvement as set forth in claim 1 and further comprising a spring arranged to bear against said conductor to urge the lower ends of said fibers to move toward said rotor.

14. The improvement as set forth in claim 13 wherein the force exerted by said spring on said conductor is adjustable.

15. The improvement as set forth in claim 14 wherein the force exerted by said spring on said conductor is adjustable by means of a threaded connection.

16. The improvement as set forth in claim 1 wherein the individual fibers of said bundles have a diameter of less than about 3 mils.

17. The improvement as set forth in claim 1 wherein the individual fibers of said bundle have an average free length of about 8–10 mm.

* * * * *